No. 611,159. Patented Sept. 20, 1898.
G. S. WEBB.
JOINT FOR PARTS OF MACHINERY.
(Application filed Feb. 15, 1897.)
(No Model.) 2 Sheets—Sheet 1.
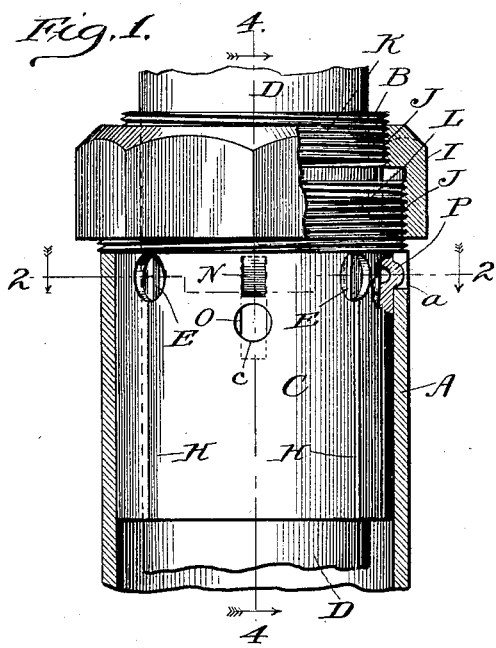
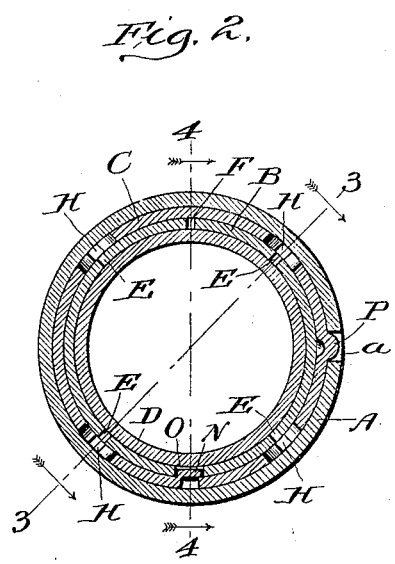
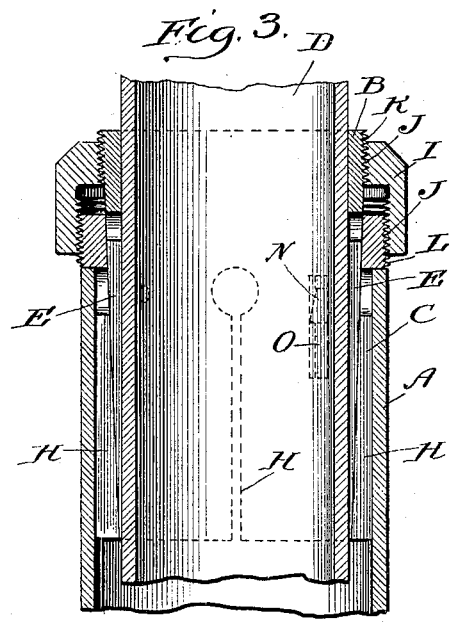
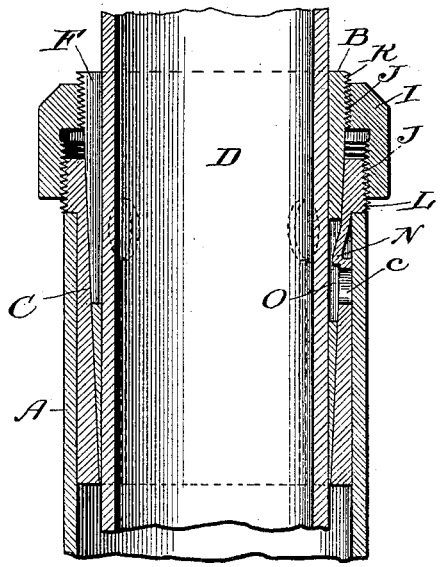
Witnesses
Martin H. Olsen.
J. Cross.
Inventor
George S. Webb
By his attorneys
Gridley & Hopkins No. 611,159. Patented Sept. 20, 1898.
G. S. WEBB.
JOINT FOR PARTS OF MACHINERY.
(Application filed Feb. 15, 1897.)
(No Model.) 2 Sheets—Sheet 2.
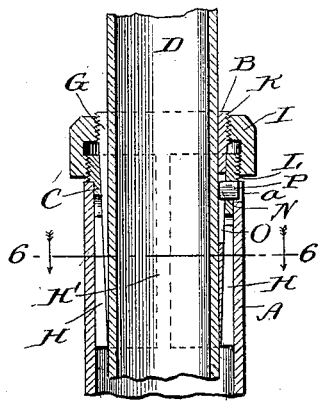
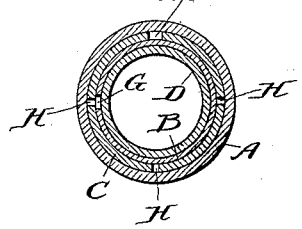
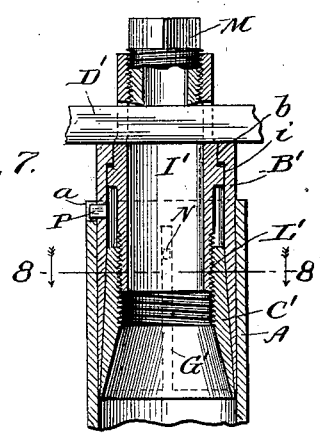
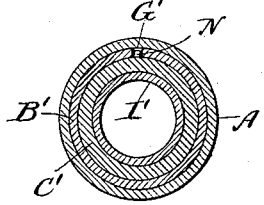
Witnesses
Martin H. Olsen,
J. Cross.
Inventor
George S. Webb
By his attorneys
Gidley Hopkins
THE NORRIS PETERS CO., PHOTO-LITHO., WASHINGTON, D. C.

UNITED STATES PATENT OFFICE.

GEORGE S. WEBB, OF AURORA, ILLINOIS.

JOINT FOR PARTS OF MACHINERY.

SPECIFICATION forming part of Letters Patent No. 611,159, dated September 20, 1898.

Application filed February 15, 1897. Serial No. 623,503. (No model.)

*To all whom it may concern:*

Be it known that I, GEORGE S. WEBB, a citizen of the United States, residing at Aurora, in the county of Kane and State of Illinois, have invented certain new and useful Improvements in Joints for Parts of Machinery, of which the following is a specification.

The object of the present invention is to provide simple and efficient means for detachably uniting two parts one of which is provided with a cylindrical socket.

The invention is not limited to the character of the machine embodying it, but, on the contrary, it resides in the joint itself, albeit it is especially well adapted for securing in place the seat-posts and handle-bar stems of bicycles. In most bicycles of modern construction the king-post of the frame consists of a cylindrical tube, and the upper portion of this tube constitutes a cylindrical socket in which the seat-post fits and is secured, and the fork-stem consists of a cylindrical tube the upper portion of which constitutes a socket in which the handle-bar stem fits and is secured.

The principal object of the present invention is to provide simple and efficient means whereby without altering the character of these sockets or providing them with special features the seat-post and handle-bar stem may be secured in their respective sockets, my idea being that the device shall be capable of almost universal application to bicycles of modern construction without alteration in order to adapt them for the reception of the device.

To this end a device embodying the invention has a part, hereinafter called a "bushing," of variable diameter, having a cylindrical exterior surface adapted to fit within a cylindrical socket in one of the two parts that are to be joined, so that when the diameter of the bushing is varied the joint between it and the socket is either tightened or loosened, depending upon the character of the variation, a part, hereinafter called a "wedge," so disposed with relation to the bushing that when the bushing and wedge are moved longitudinally relatively to each other the diameter of the bushing is varied, a part, hereinafter called a "coupling," and means through the medium of which the coupling engages both the bushing and the wedge, so that when the coupling is turned in either direction the bushing and wedge are positively moved longitudinally relatively to each other and the joint either tightened or loosened, depending upon the direction of the movement. Preferably both the bushing and the wedge are of variable diameter. Necessarily one of them is, and it is to this one that the term "bushing" will be applied.

I am aware that it is not new to construct a joint having a bushing and a wedge of the character described and a nut turned onto a threaded portion of the wedge and engaging the bushing, so that when the nut is turned in one direction the wedge will be drawn into the bushing and the bushing be thereby expanded. In the joint here referred to the nut has no connection with the bushing, but simply bears upon it when turned in one direction, so that when it is turned in the other direction it simply moves away from the bushing, leaving the wedge undisturbed in the position to which it is drawn when the nut is turned in the direction first mentioned. After the nut is thus backed off, in order to loosen this joint the wedge must be driven out by hammering upon it, and in many instances this would be difficult or impossible by reason of the presence of contiguous parts or the inaccessibility of the wedge, and to provide a joint which is not open to this objection is one of the objects of the present invention. To this end I so connect the part herein called a "coupling" (which may, and preferably does, take the form of a nut) with both the bushing and the wedge that when it is turned in one direction the bushing and wedge will be positively moved longitudinally relatively to each other and the joint thereby tightened, and when it is turned in the opposite direction the bushing and wedge will be positively moved longitudinally relatively to each other and the joint thereby loosened. I believe myself to be the first to so connect the coupling with a bushing of variable diameter having a cylindrical exterior surface adapted to fit within a cylindrical socket and with a wedge that when the coupling is turned in one direction the bushing and wedge will be given a positive action which loosens the joint without the necessity for any hammering, and this is important where the parts of the machine are so disposed that the wedge is inaccessible—as, for example, where the joint is used for securing in place the seat-post of a bicycle.

Another object of the invention is to provide means for preventing a bushing and wedge of the character described from turning relatively to each other, while leaving them perfectly free to move longitudinally relatively to each other and relatively to the parts to be joined during the process of tightening or loosening the joint.

To these ends the invention consists in the features of novelty that are hereinafter fully described with reference to the accompanying drawings, which are made a part of this specification, and in which—

Figure 1 is a sectional elevation of a joint embodying the invention in its preferred form. Fig. 2 is a transverse section thereof on the line 2 2, Fig. 1. Fig. 3 is a longitudinal section thereof on the line 3 3, Fig. 2. Fig. 4 is a longitudinal section thereof on the line 4 4, Figs. 1 and 2. Figs. 5 and 6 are respectively a longitudinal and a transverse section of a joint embodying the generic features of the invention, but differing somewhat in its details of construction from the joints shown in the other figures, the cutting plane of Fig. 6 being indicated by the line 6 6, Fig. 5. Figs. 7 and 8 are respectively a longitudinal and a transverse section of a joint embodying the generic features of the invention, but differing somewhat in its details of construction from the joints shown in the other figures, the cutting plane of Fig. 8 being indicated by the line 8 8, Fig. 7.

In all of the figures, A represents one of the two parts to be joined, and the invention is not concerned with the character of this part further than that it shall have a cylindrical socket in which the bushing and wedge are disposed.

In Figs. 1 to 6, inclusive, B and C represent the bushing and wedge, respectively. In these forms of the invention the wedge consists of a sleeve or short tube of variable diameter the interior of which is cylindrical and when in normal condition corresponds in diameter with the exterior of the other, D, of the two parts that are to be joined. Preferably the wedge is variable in diameter from end to end, and this is preferably accomplished by providing it with a number of longitudinal slots E, which commence at its inner and proceed nearly to its outer end, and a single longitudinal slot F, which commences at its outer end and proceeds inward and past the outer ends of the slots E. With this arrangement of the slots E and F the wedge is made of variable diameter from end to end without splitting it from end to end; but, if desired, its variability may be provided for by splitting it from end to end, as shown at G in Figs. 5 and 6, leaving it otherwise continuous.

As shown in Figs. 7 and 8, the wedge consists of a plug having a tapering exterior which fits within the bushing B', the interior of which flares inward to correspond with the taper of the wedge.

In the preferred form of the invention the bushing consists of a sleeve or short tube the interior of which flares outwardly (toward its outer end) and engages the outer surface of the wedge, which is correspondingly tapered, the outer surface of the bushing being cylindrical and of such diameter that when in normal condition it fits snugly the cylindrical socket in the part A. Preferably the portion of the bushing which occupies the socket of the part A is of variable diameter, and to this end it may be provided with a number of longitudinal slots, as shown at H in Figs. 1 to 6, inclusive, and G' in Figs. 7 and 8, which commence at its inner end and proceed outward a suitable distance therefrom, and, if desired, it may be of variable diameter from end to end, in which case it is split, as shown at H' in Figs. 5 and 6.

In the forms of the invention shown in Figs. 1 to 6, inclusive, when the bushing and wedge are moved relatively toward each other longitudinally the bushing contracts the wedge, so as to cause its inner surface to bind against the exterior surface of the part D, and at the same time the wedge expands the bushing so as to cause its outer surface to bind against the interior of the part A. In the form of the invention shown in Figs. 7 and 8 when the wedge is moved toward the bushing it expands the bushing, so as to cause its outer surface to bind against the interior of the part A; but the diameter of the wedge is not varied. In each instance the effect of this relative movement of the bushing and wedge is to tighten the joint, and of course the effect of their relative movement in the opposite direction is to loosen the joint.

For relatively moving the bushing and wedge I use the part which is herein called a "coupling" and is shown at I in Figs. 1 to 6 and at I' in Figs. 7 and 8. In each instance means are provided for so connecting the coupling with both the bushing and the wedge that when it is turned in one direction the bushing and wedge will be positively moved and the joint tightened, and when it is turned in the opposite direction the bushing and wedge will be positively moved and the joint loosened. Preferably the means for accomplishing this consists of a right-and-left thread formed on the interior of the coupling, as shown at J, and corresponding threads formed upon the wedge and bushing, as shown at K and L, respectively. By this simple means when the coupling is turned in one direction the bushing and wedge are so moved as to tighten the joint, and when turned in the opposite direction they are so moved as to loosen the joint, thus producing a positive movement which avoids the necessity for any hammering in order to drive the wedge out of its position in the bushing and permit the part or parts of variable diameter to return to normal diameter. I desire to have it understood, however, that it is not necessary to have the coupling engage both the bushing and wedge through the medium of threads; but, on the contrary, any form of connection which will permit the coupling to turn relatively to both the bushing and wedge and which will at the same time prevent any relative longitudinal movement of the bushing and wedge, excepting only such longitudinal movement as is due to the rotation of the coupling, is within the scope of my invention, generically considered. Hence I have shown in Figs. 7 and 8 an arrangement in which the coupling I' has threaded engagement with the wedge, as shown at L', and has only a swivel connection with the bushing—that is to say, it is so connected with the bushing that it is capable of turning but incapable of any considerable longitudinal movement relatively thereto. This swivel connection may be effected by providing the bushing with an internal flange b and by providing the coupling with an external flange i and with a part D', which flange and part engage opposite sides of the flange b. As here shown, this part D' is one of the two parts to be joined, (a fragment of the spring of a saddle.) The part D' passes through an opening in the part I' and is there secured by a screw M.

In order to prevent the relative rotation of the bushing and wedge, one of them is preferably provided with a stud N, which projects into a longitudinal slot in the other. In the preferred form of the invention this slot is shown at O, while in the form shown in Figs. 7 and 8 the slot G' is made use of.

In order to prevent the parts from turning within the socket of the part A while the joint is being tightened or loosened, the bushing is provided with a stud P, which projects into a notch a in the part A. Preferably the studs N and P are formed by the action of a punch, as shown in Figs. 1, 2, and 4; but, if desired, they may be a separate part, as shown in Figs. 5 and 7.

In Fig. 4 the bushing B is provided adjacent to the stud N with an opening c, the object of which is to enable that part of the wedge C in which the slot O is formed to be pressed inward far enough to disengage the stud N from the slot when it is desired to completely separate the bushing and wedge. In the construction shown in Figs. 5 and 6 this separation of the parts is permitted by reason of the fact that the wedge is of variable diameter from end to end, and in the construction shown in Figs. 7 and 8 their separation is permitted by reason of the fact that the slot G' extends quite to the end of the bushing.

Thus it will be seen that so far as the generic features of my invention are concerned the part herein termed a "bushing" may be of variable diameter throughout its entire or only a portion of its length. The part herein termed a "wedge" may be of variable diameter throughout its entire length or only a portion thereof or it may be of invariable diameter. The part herein termed a "coupling" may have threaded engagement with both the bushing and wedge or it may have threaded engagement with only one of them and a swiveled or equivalent engagement with the other.

Having thus described my invention, the following is what I claim as new therein and desire to secure by Letters Patent:

1. In a clamp-joint for adjustably securing together two parts, one of which has a socket, the combination of a bushing occupying the socket, said bushing being made of elastic material so as to be of variable diameter, a wedge occupying the bushing, means whereby the wedge expands the bushing when moved longitudinally relatively thereto in one direction, a rotatable coupling disposed concentrically with relation to the bushing and wedge, and means whereby both the bushing and wedge engage the coupling upon opposite sides of its center, whereby the strains upon the coupling are distributed to opposite sides thereof and unbalanced lateral strains upon the parts are avoided, and whereby the bushing and wedge may be positively moved longitudinally, relatively to each other, in either direction, by rotating the coupling in one direction or the other, as may be necessary, substantially as set forth.

2. In a clamp-joint for adjustably securing together two parts, one of which has a cylindrical socket, the combination of a bushing, cylindrical on its exterior, occupying the socket, said bushing being made of elastic material so as to be of variable diameter and being flared on its interior, a wedge having a tapered exterior occupying the bushing, a rotatable coupling disposed concentrically with relation to the bushing and wedge, a means whereby the bushing and wedge engage the coupling upon opposite sides of its center, whereby the strains upon the coupling are distributed to all sides thereof and unbalanced lateral strains upon the parts are avoided, and whereby the bushing and the wedge may be positively moved longitudinally, relatively to each other, in either direction by rotating the coupling in one direction or the other, as may be necessary, substantially as set forth.

3. In a clamp-joint for adjustably securing together two parts, one of which has a cylindrical socket into which the other extends, leaving an annular space between them the combination of a bushing, cylindrical on its exterior, occupying the annular space, said bushing being made of elastic material so as to be of variable diameter and being flared on its interior, a wedge occupying the bushing and surrounding the inner one of the two parts to be secured together, said wedge having a tapering exterior fitting the flaring interior of the bushing, a rotatable coupling disposed concentrically with relation to the bushing and wedge, a means whereby adjacent ends of both the bushing and wedge engage the coupling upon opposite sides of its center, substantially as set forth.

GEORGE S. WEBB.

Witnesses:
L. M. HOPKINS,
I. CROSS.